United States Patent
Patankar et al.

(10) Patent No.: US 12,071,505 B2
(45) Date of Patent: Aug. 27, 2024

(54) POLYURETHANES AND METHOD FOR MAKING POLYURETHANES

(71) Applicant: Dow Global Technologies LLC, Midland, MI (US)

(72) Inventors: Kshitish A. Patankar, Midland, MI (US); Arjun Raghuraman, Pearland, TX (US); Thomas P. Willumstad, Pearland, TX (US); Mark F. Sonnenschein, Midland, MI (US); Jody Henning, Midland, MI (US); Heather A. Spinney, Midland, MI (US); David R. Wilson, Midland, MI (US); Sukrit Mukhopadhyay, Midland, MI (US); William H. Heath, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 674 days.

(21) Appl. No.: 17/277,416

(22) PCT Filed: Sep. 17, 2019

(86) PCT No.: PCT/US2019/051571
§ 371 (c)(1),
(2) Date: Mar. 18, 2021

(87) PCT Pub. No.: WO2020/068493
PCT Pub. Date: Apr. 2, 2020

(65) Prior Publication Data
US 2022/0033565 A1    Feb. 3, 2022

Related U.S. Application Data

(60) Provisional application No. 62/738,611, filed on Sep. 28, 2018.

(51) Int. Cl.
| | | |
|---|---|---|
| *C08G 18/48* | (2006.01) | |
| *C08G 18/32* | (2006.01) | |
| *C08G 18/66* | (2006.01) | |
| *C08G 65/26* | (2006.01) | |

(52) U.S. Cl.
CPC ..... *C08G 18/4825* (2013.01); *C08G 18/3206* (2013.01); *C08G 18/6674* (2013.01); *C08G 65/2609* (2013.01); *C08G 65/2654* (2013.01); *C08G 65/2684* (2013.01)

(58) Field of Classification Search
None
See application file for complete search history.

(56) References Cited

U.S. PATENT DOCUMENTS 6,531,566 B1    3/2003    Satake

FOREIGN PATENT DOCUMENTS

| CA | 2326444 C | * | 3/2010 |
|---|---|---|---|
| CA | 2420833 C | * | 12/2010 |
| EP | 1340780 A | | 9/2003 |
| JP | 4601818 B2 | * | 12/2010 |
| RO | 86608 A | | 4/1985 |

* cited by examiner

*Primary Examiner* — Tae H Yoon

(57) ABSTRACT

Polyurethanes are made in a one-shot process from one or more polyols having a hydroxyl equivalent weight of at least 350, wherein at least 50% of the weight of iii) is a hydroxyl-containing polymer of propylene oxide, the hydroxyl-containing polymer of propylene oxide having a hydroxyl equivalent weight of at least 350, an average of 1.8 to 3 hydroxyl groups per molecule of which hydroxyl groups 40 to 70% are primary hydroxyl groups, an oxyethylene content of no greater than 10% by weight based on the weight of the polymer and a polydispersity of 1.175 or less. The polyurethanes exhibit excellent mechanical properties, are highly hygroscopic and cured rapidly.

12 Claims, No Drawings

POLYURETHANES AND METHOD FOR MAKING POLYURETHANES

CROSS-REFERENCE TO RELATED APPLICATIONS

This application is a 371 National Stage Application of PCT/US2019/051571, filed on Mar. 18, 2021, which claims the benefit of U.S. Provisional Application No. 62/738,611, filed on Sep. 28, 2018, the contents of which are hereby incorporated by references in their entirety.

This invention pertains to polyurethanes and methods for making such polyurethanes, particularly elastomers, coatings and sealants.

Casting methods are used to make a variety of rubbery polyurethane products. These include materials such as gaskets and seals, tubing, rollers for many applications such as coating rollers, nip rollers, drive belts, squeeze rollers and business machine rollers, pulleys, conveyor wheels, fork truck wheels, tricycle wheels, caster wheels, industrial tires, rod wipers, snow plow blades, chute and cyclone liners, agitator blades and many more.

Polyurethane cast elastomers are typically segmented polymers that have "soft" and "hard" segments. The soft segment is a low transition temperature phase, whereas the hard segment is characterized as having a glass transition temperature well above room temperature. Differentiation in these segments arises from the raw materials used to make the elastomers. The soft segments are derived from polyols that have hydroxyl equivalent weights of 350 or more. Polyether polyols are very commonly used in cast polyurethane formulations to produce the soft segment. The hard segments derive from polyisocyanate and chain extenders.

Elastomers are produced via two main methods, the so-called "one-shot" method and the "prepolymer" method. In the one-shot method, all the reactants—polyols, chain extenders and polyisocyanate—are mixed and reacted at once.

In the prepolymer method, the polyol and the polyisocyanate are reacted first, thereby consuming the polyol and producing a "prepolymer" that has isocyanate groups. The prepolymer is subsequently reacted with the chain extender (and in come cases another portion of the polyol) to produce the elastomer. The prepolymer-forming step is performed outside the mold. Typically, the prepolymer is a previously-manufactured product made, packaged and sold to the part manufacturer that performs the prepolymer-chain extender reaction to produce the final product. The high viscosities of the prepolymers often require the use of a solvent and/or extrusion steps.

The one-shot method is advantaged in that one reaction step is needed, not two, and for that reason offers the possibility of minimizing production costs. However, some polyols react slowly towards polyisocyanates. In such cases, long in-mold residence times are needed when this reaction takes place in molding equipment, occupying the equipment, increasing cycle time and reducing overall productivity of the equipment. This offsets the advantage of avoiding the costs of first forming the prepolymer.

One way of ameliorating the problem of slow reactivity in one-shot processes is to use polyols that have mostly primary hydroxyl groups. Primary alcohols react much more rapidly than secondary alcohols in reactions with polyisocyanates. In practice, this usually means that the polyols are produced with oxyethylene blocks at the ends of the chains. These blocks, which are formed by polymerizing ethylene oxide onto existing propylene oxide-derived polyol chain ends and then introducing the desired primary hydroxyl groups. These polyols react more rapidly toward isocyanate groups, speeding the cure. However, the presence of these oxyethylene blocks renders the elastomer product somewhat hygroscopic. Therefore, this is not an entirely acceptable approach to solving the reactivity problem. When low moisture pick-up is wanted in the elastomer product, the generally preferred manufacturing technique is the prepolymer method, so that the slower polyol-isocyanate reaction can be performed without tying up the mold.

Therefore, a process is desired by which polyurethanes can be made in a one-shot process with acceptably short mold residence times, while minimizing or eliminating oxyethylene blocks in the polyols used to make the polyurethane.

The invention in one aspect is a polyurethane which is the reaction product of a reaction mixture including i) one or more polyisocyanates, ii) one or more chain extenders and/or crosslinkers iii) one or more polyols having a hydroxyl equivalent weight of at least 350, and iv) one or more urethane catalysts, wherein at least 50% of the weight of iii) is a hydroxyl-containing polymer of propylene oxide, the polymer of propylene oxide having a hydroxyl equivalent weight of at least 350, an average of 1.8 to 3 hydroxyl groups per molecule of which hydroxyl groups 40% to 70% are primary hydroxyl groups, an oxyethylene content of no greater than 10% by weight based on the weight of the polymer and a polydispersity of 1.175 or less.

The polyurethane of the invention is characterized by having high Young's modulus (at a given hard segment content) and low moisture pick-up.

The invention is in another aspect a one-shot method for making a polyurethane, comprising forming a reaction mixture comprising i) one or more polyisocyanates, wherein the one or more polyisocyanates has a number average isocyanate equivalent weight of no greater than 200, and isocyanate-reactive materials that include ii) at least one chain extender and/or at least one crosslinker and iii) one or more polyols having a hydroxyl equivalent weight of at least 350, wherein at least 50% of the weight of iii) is a hydroxyl-containing polymer of propylene oxide, the polymer of propylene oxide having a hydroxyl equivalent weight of at least 350, an average of 1.8 to 3 hydroxyl groups per molecule of which hydroxyl groups at least 40% are primary hydroxyl groups, an oxyethylene content of no greater than 10% by weight based on the weight of the polymer and a polydispersity of 1.175 or less, and curing the reaction mixture in one step and in the presence of no more than 5%, based on the weight of the reaction mixture, of a solvent, to form the polyurethane.

This method has the advantages of fast curing times, the curing times being comparable to those achieved using polyols iii) which have large amounts of oxyethylene units. In addition, the polyurethanes produced in the invention have high tensile strengths and low moisture pickups.

For purposes of this invention, the "one-shot" process is characterized in that i) the polyisocyanate(s) have a number average isocyanate equivalent weight of no more than 200; and ii) the polyisocyanate(s), chain extender and/or crosslinker and polyether polyol(s) having a hydroxyl equivalent weight of at least 350 are all formed into a mixture and cured such that the chain extender and/or crosslinker and polyether polyol(s) all react simultaneously with the polyisocyanate(s).

A "prepolymer" process is characterized in that i) at least 50% by weight of the polyol(s) having a hydroxyl equivalent weight of 350 or more are first reacted with the polyisocyanate(s) to form a urethane group-containing, isocyanate-terminated prepolymer having an isocyanate content of 20% or less by weight, and then ii) the prepolymer is subsequently cured by reaction with the chain extender and any remaining polyols having a hydroxyl equivalent weight of 350 or more to produce the polyurethane.

The polyisocyanate(s) each (if more than one) are organic compounds having two or more isocyanate groups per molecule. The polyisocyanate(s) preferably have a number average of no more than 4 isocyanate groups and more preferably have no more than 3 or no more than 2.7 isocyanate groups per molecule. In some embodiments the polyisocyanates have a number average of 2 to 2.5 or 2 to 2.3 isocyanate groups per molecule.

The polyisocyanate(s) have a number average isocyanate equivalent weight of up to 200, such as 80 to 200, 80 to 180, or 80 to 150.

Among the useful polyisocyanate compounds are aromatic polyisocyanates such as m-phenylene diisocyanate, toluene-2,4-diisocyanate, toluene-2,6-diisocyanate, naphthylene-1,5-diisocyanate, methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4,6-triisocyanate and 4,4'-dimethyldiphenylmethane-2,2',5,5'-tetraisocyanate. Modified aromatic polyisocyanates that contain urethane, urea, biuret, carbodiimide, uretoneimine, allophanate or other groups formed by reaction of an isocyanate group are also useful. A preferred aromatic polyisocyanate is diphenylmethane diisocyanate (any isomer or mixture of isomers) or PMDI (or a mixture thereof that is commonly referred to as "polymeric MDI"), and so-called "liquid MDI" products that are mixtures of MDI and MDI derivatives that have biuret, carbodiimide, uretoneimine and/or allophanate linkages.

Further useful polyisocyanate compounds having an isocyanate equivalent weight of up to 200 include one or more aliphatic polyisocyanates. Examples of these include cyclohexane diisocyanate, 1,3- and/or 1,4-bis(isocyanatomethyl)cyclohexane, 1-methyl-cyclohexane-2,4-diisocyanate, 1-methyl-cyclohexane-2,6-diisocyanate, methylene dicyclohexane diisocyanate, isophorone diisocyanate, lysine diisocyanates and hexamethylene diisocyanate, any of which may be modified to contain urethane, urea, biuret, carbodiimide, uretoneimine, allophonate or other groups formed by reaction of an isocyanate group.

The chain extender for purposes of this invention, is a compound having exactly two isocyanate-reactive groups per molecule and an equivalent weight per isocyanate-reactive group of less than 175. The isocyanate-reactive groups may be, for example, hydroxyl and/or primary and/or secondary amino groups.

Examples of hydroxyl group-containing chain extenders include 1,2-ethane diol, 1,2- or 1,3-propane diol, 1,4-butane diol, diethylene glycol, triethylene glycol, dipropylene glycol, tripropylene glycol, neopentyl glycol and alkoxylates of any of the foregoing having a hydroxyl equivalent weight of less than 175.

Examples of diamine chain extenders include aliphatic polyamines such as ethylene diamine, piperazine, diethylene triamine, triethylene tetraamine, tetraethylenepentaaminepiperazine, N-(2-aminoethyl)piperazine, N, N'-bis(2-aminoethyl)piperazine, cyclohexane diamine (including any one or more of the 1,2-, 1,3- and 1,4-isomers), bis(aminomethyl)cyclohexane (including any one or more of the 1,2-, 1,3- and 1,4-isomers) and bis(2-aminoethyl)cyclohexane, and aromatic polyamines such as toluene diamine, diethyltoluenediamine, methylenediphenyldiamine phenylene diamine and bis(aminomethyl)benzene.

Examples of crosslinkers include glycerin, trimethylolpropane, trimethylolethane, erythritol, pentaerythritol, triethanolamine, diethanolamine and alkoxylates of any of the foregoing having a hydroxyl equivalent weight of less than 175. Aminoalcohols such as ethanolamine and diethanolamine are also useful crosslinkers.

At least 50% of the polyols having a hydroxyl equivalent weight of 350 are one or more hydroxyl-containing polymers of propylene oxide characterized by a) having a hydroxyl equivalent weight of at least 350, b) having a number average of 1.8 to 3 hydroxyl groups per molecule, c) at least 40% of its hydroxyl groups are primary hydroxyl groups, d) having an oxyethylene content of no greater than 10% by weight based on the weight of the polymer and e) having a polydispersity of 1.175 or less.

The hydroxyl-containing polymer of propylene oxide may be a homopolymer of propylene oxide, or a copolymer of propylene oxide and one or more other alkylene oxides. If a copolymer, oxy(methyl)ethylene (oxypropylene) groups formed in the polymerization of propylene oxide should constitute at least 50% of the total weight of the polymer, and preferably constitute at least 75%, at least 90%, at least 95% or at least 98% thereof. Oxyethylene groups preferably are absent and if present constitute no more than 10% of the total weight of the polymer and preferably no more than 5%, no more than 2% or no more than 1% thereof. Another suitable comonomer is butylene oxide.

The number average hydroxyl functionality of the hydroxyl-containing polymer of propylene oxide may be at least 1.9 or at least 2.0 and may be up to 2.8, up to 2.6, up to 2.5, up to 2.3 or up to 2.2. For purposes of this invention, all hydroxyl functionalities are nominal functionalities, equal to the number average hydroxyl groups per molecule of the starter(s) used to prepare the polymer.

The hydroxyl equivalent weight may be at least 400, at least 500, at least 700 or at least 800 and may be, for example, up to 3000, up to 2500, up to 2000, up to 1750, up to 1500 or up to 1200. Hydroxyl equivalent weight is determined by measuring the hydroxyl number in mg KOH/g polyol using titration methods, and converting the hydroxyl number to a hydroxyl equivalent weight using the relationship equivalent weight=56,100÷hydroxyl number.

In some embodiments, at least 40%, or at least 45% of the hydroxyl groups of the polymer of propylene oxide are primary. Although up to 100% of the hydroxyl groups may be primary, it is difficult in practice to produce very high proportions of primary hydroxyl groups at a low oxyethylene content. More typically, up to 85%, up to 80%, up to 70% or up to 65% of the hydroxyl groups are primary. Primary hydroxyl content can be determined by $^9$F NMR analysis of a trifluoroacetic anhydride derivative of the polyol.

The hydroxyl-containing polymer of propylene oxide has a polydispersity (weight average molecular weight divided by number average molecular weight, in each case determined by gel permeation chromatography (GPC) against polyether polyol standards or polystyrene standards), of no greater than 1.175. The polydispersity may be, for example, 1.00 to 1.16, 1.00 to 1.16, 1.00 to 1.12, 1.00 to 1.10, 1.00 to 1.08 or 1.00 to 1.06.

The hydroxyl-containing polymer of propylene oxide preferably contains at most small quantities of acetals.

Acetals can be formed in some alkylene oxide polymerization processes through the formation and subsequent reaction of aldehyde-containing species as described, for example, by Raghuraman et al. in *Macromolecules* 2016, 49(18), pp. 6790-6798. The hydroxyl-containing polymer of propylene oxide preferably contains at most 5 mole-% acetals, and more preferably no more than 2 mole-%, no more than 1.5 mole-% or no more than 1 mole-% thereof, based on the moles of carbon atoms in the polymer. Acetal content can be determined by inverse-gated $^{13}$C NMR spectroscopy. A suitable procedure is as follows: Samples are prepared in 10-mm NMR tubes as ~90% solutions in DMSO-d6. $^{13}$C NMR data is acquired using a Bruker Avance 400-MHz spectrometer equipped with a cryoprobe or equivalent apparatus, using at least 64 transient scans and a 30-second relaxation delay (optimized for quantitative measurements). The acquisition is carried out using spectral width of 25000 Hz and a file size of 65K data points. Relative moles of acetal species are measured by integrating the area under resonances from acetal carbons. Mole % acetal=100%×relative moles of acetal carbon÷sum of relative moles of all carbon species in the spectrum.

The hydroxyl-containing polymer of propylene oxide can be made by polymerizing propylene oxide in the presence of a Lewis acid catalyst having the general formula

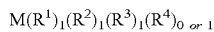

$M(R^1)_1(R^2)_1(R^3)_1(R^4)_{0\ or\ 1}$ wherein M is boron, aluminum, indium, bismuth or erbium, $R^1$ is a fluoroalkyl-substituted phenyl group and $R^2$ and $R^3$ each are a fluoroalkyl-substituted phenyl group, a fluoro-substituted phenyl group, a chloro-substituted phenyl group, or a fluoro- and chloro-substituted phenyl group provided that R', $R^2$ and $R^3$ are not all the same. Optional $R^4$ is a functional group or functional polymer group. The M in the general formula may exist as a metal salt ion or as an integrally bonded part of the formula.

The at least one fluoroalkyl substituent of the fluoroalkyl-substituted phenyl group $R^1$ may be, example, a fluorine-substituted alkyl group having, for example, 1 to 5 carbon atoms. Fluorine-substituted methyl groups are preferred. The alkyl groups contain at least one fluorine substituent and may have any greater number, up to being perfluorinated. A preferred fluoroalkyl substituent includes a —CF$_3$ moiety. In some embodiments the fluoroalkyl substituents are —CF$_3$.

The fluoroalkyl-substituted phenyl group $R^1$ can be substituted with 1 to 5 fluoroalkyl groups. The fluoroalkyl groups can occupy any of the positions on the phenyl ring. In some embodiments, the $R^1$ group is substituted with 2 fluoroalkyl groups, which may be positioned at the 2 and 5 carbons or the 3 and 5 carbons. In specific embodiments, the fluoroalkyl-substituted phenyl group $R^1$ is 2,5- or 3,5-bis(trifluoromethyl)phenyl.

$R^1$, may be substituted to include other groups in addition to the at least one fluoroalkyl group, e.g., a fluorine atom and/or chlorine atom that replaces at least one hydrogen of the phenyl group.

$R^2$ and $R^3$, if a fluoroalkyl-substituted phenyl group, is as described with regard to $R^1$, provided that at least one of $R^2$ and $R^3$ is different than $R^1$. $R^2$ and/or $R^3$ may be fluoro-substituted and/or chloro-substituted, instead of or in addition to being fluoroalkyl-substituted. The phenyl group $R^2$ or $R^3$ may be substituted with 1 to 5 fluoroalkyl, fluorine and/or chlorine atoms. Examples of $R^2$ and $R_3$ groups include, in addition to 2,5- or 3,5-bis(trifluoromethyl)phenyl,

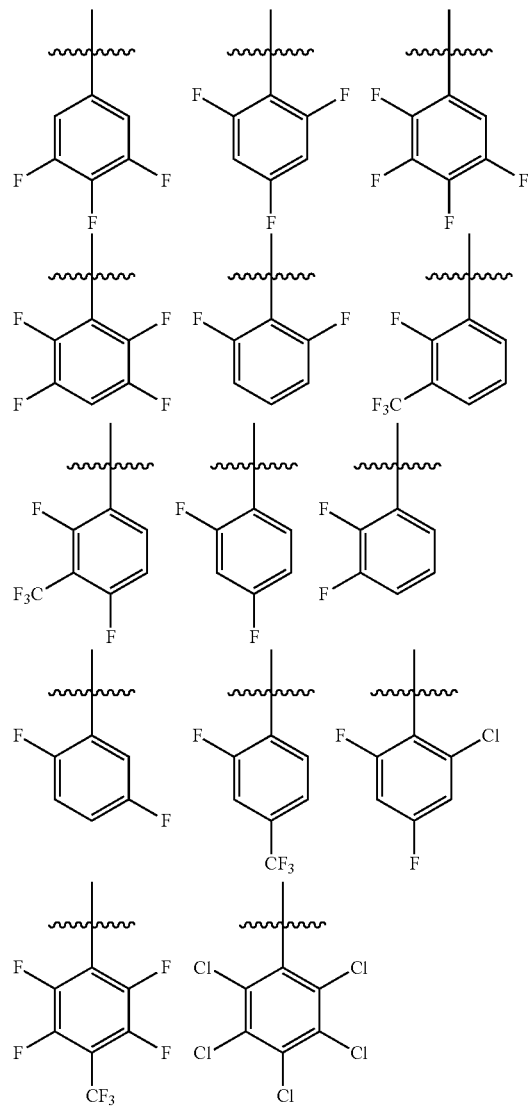

With respect to optional $R^4$, the functional group or functional polymer group may be a Lewis base that forms a complex with the Lewis acid catalyst). By functional group or functional polymer group it is meant a molecule that contains at least one of the following: water, an alcohol, an alkoxy (examples include a linear or branched ether and a cyclic ether), a ketone, an ester, an organosilane, an organosiloxane, an oxime, and substituted analogs thereof. Each of the alcohol, linear or branched ether, cyclic ether, ketone, ester, alkoxy, organosilane, organosiloxane, and oxime may include from 2-20 carbon atoms, from 2-12 carbon atoms, from 2-8 carbon atoms, and/or from 3-6 carbon atoms.

For example, the functional group or functional polymer group may have the formula $(OYH)_n$, wherein O is oxygen, H is hydrogen, Y is H or an alkyl group, and n is an integer (e.g., an integer from 1 to 100). However, other functional groups or functional polymer groups combinable with the Lewis acid catalyst can be used. Exemplary cyclic ethers include tetrahydrofuran and tetrahydropyran.

Suitable $R^4$ groups include diethyl ether, cyclopentyl methyl ether, methyl tertiary-butyl ether, tetrahydrofuran, tetrahydropyran, 1,4-dioxane, acetone, methyl isopropyl ketone, isopropyl acetate, and isobutyl acetate.

Methods for making such catalysts are described, for example, in PCT/US2018/050995 and PCT/US2018/051001, both filed 14 Sep. 2018.

Examples of suitable Lewis acid catalysts as described above include (2,5-bis(trifluoromethyl)phenyl)bis(3,5-bis(trifluoromethyl)phenyl)borane, bis(2,5-bis(trifluoromethyl)phenyl) (3,5-bis(trifluoromethyl)phenyl)borane, bis(3,5-bis(trifluoromethyl)phenyl) (2,3,5,6-tetrafluoro-4-(trifluoromethyl)phenyl)borane, bis(3,5-bis(trifluoromethyl)phenyl)(pentachlorophenyl)borane, and the tetrahydrofuran (THF) adduct of bis(3,5-bis(trifluoromethyl)phenyl)(2,4,6-trifluorophenyl)borane.

Polyurethanes are made by reacting i) one or more polyisocyanates as described above with isocyanate-reactive materials that include ii) at least one chain and/or at least one crosslinker, and iii) one or more polyols having a hydroxyl equivalent weight of at least 350, wherein at least 50% of the weight of iii) is a hydroxyl-containing polymer of propylene oxide as described herein. The reaction mixture may also include one or more optional materials as described below. This reaction can be performed using either a prepolymer or one-shot process, although some particular benefits of the invention are realized when the one-shot process is used.

In some embodiments, the relative amounts of isocyanate-reactive materials, chain extenders and/or crosslinkers and polyols are selected so the polyurethane has a hard segment content of 15 to 60% by weight. Hard segment content is calculated from the weights of starting materials, as follows:

Hard segment (%)=100%×($wt_{isocyanate}$+$wt_{chain\ extender\ plus\ crosslinker}$)÷($wt_{isocyanate}$+$wt_{chain\ extender\ plus\ crosslinker}$+$wt_{polyol}$), wherein $wt_{polyol}$ includes the weight of all isocyanate-reactive materials having hydroxyl equivalent weights greater than 175. The hard segment content may be at least 20%, at least 30% or at least 35% and may be up to 55% or up to 50%, in all cases by weight.

The reaction mixture may contain various optional ingredients. Among these are other isocyanate-reactive materials, different from the chain extender and/or crosslinker and hydroxyl-containing polymer of propylene oxide as described above. These include, for example, one or more polyether polyols, one or more polyester polyols, polyalkylene carbonate polyols, hydroxyl-terminated diene rubbers, polyvinyl alcohols, and amine-terminated polyethers. The hydroxyl-containing polymer of propylene oxide constitutes at least 50% of the total weight of all isocyanate-reactive materials having equivalent weights of 350 or more, and may constitute at least 70%, at least 80%, at least 90% or at least 95% thereof to as much as 100% thereof. The optional isocyanate-reactive materials, if present at all, preferably constitute no more than 10%, no more than 5%, more than 3% or no more than 1% of the combined weight of all polyisocyanates and all isocyanate-reactive components of the reaction mixture.

Other optional ingredients include, for example, particulate fillers, colorants, catalysts, surfactants, desiccants and/or water scavengers, antioxidants, preservatives, biocides, reinforcing fibers, thixotropic agents and the like.

The reaction mixture preferably contains no more than 5 weight percent or less than 2 weight percent (and may be devoid of) a solvent. A solvent for purposes of this invention is a material having a boiling temperature of 200° C. or less at standard pressure and which is not isocyanate-containing and is not isocyanate-reactive (i.e., does not contain isocyanate-reactive groups).

Polyurethanes are made in the prepolymer process by first forming a urethane group-containing, isocyanate terminated prepolymer by reacting at least a portion of the polyol(s) having a hydroxyl equivalent weight of at least 350 with the polyisocyanate and then curing the prepolymer through reaction with the chain extender and/or crosslinker A portion of the chain extender and/or crosslinker can be present during prepolymer formation and, similarly, a portion of the polyol(s) having an equivalent weight of 350 or more can be present during the curing step. The prepolymer may have an isocyanate content of at least 1%, at least 2%, at least 3% or at least 4%, up to 20%, up to 15%, up to 12% or up to 10%.

Polyurethanes are made in the one-shot process by forming a reaction mixture containing the polyisocyanate(s), chain extenders and/or crosslinkers, and polyol(s) having an equivalent weight of 350 or more and curing them all at once.

The process of the invention is particularly suitable for producing polyurethane elastomers, sealants and/or adhesives, and coatings.

Elastomers are generally characterized in being flexible materials having an elongation to break of at least 100% as measured according to ASTM D638. An elastomer product of the invention may be a static or dynamic type, static elastomers being products which are not subject to regular deformation during use (such as gasketing materials and certain types of rollers) and dynamic elastomers being products that are subjected to regular and repeated deformation as they are used. The elastomer of the invention is useful, for example, as gaskets and seals, tubing, rollers for many applications such as coating rollers, nip rollers, drive belts, squeeze rollers, business machine rollers, pulleys, conveyor wheels, fork truck wheels, tricycle wheels, caster wheels, industrial tires, rod wipers, snow plow blades, chute and cyclone liners, agitator blades and many more.

The elastomer may be non-cellular, cellular or microcellular. A cellular or microcellular elastomer can be formed by incorporating a physical and/or chemical blowing agent into the reaction mixture and curing the reaction mixture under conditions that the blowing agent produces a gas that becomes trapped in the cured material to produce cells. Alternatively or in addition, air, carbon dioxide, nitrogen or other gas can be whipped into the reaction mixture to form a froth, which is cured to form a cellular, or microcellular elastomer.

When making elastomers or other molded or shaped product, curing may take place in a mold or other form, which may be open or closed. It may be performed on a belt or other apparatus. The reaction mixture may be formed into a layer on a substrate and cured thereon to form a composite. A fibrous material may be impregnated with the reaction mixture, after which the reaction mixture is cured in place to form a fiber-reinforced composite.

Elastomer curing is generally performed at an elevated temperature. A suitable temperature is, for example at least 50° C., preferably at least 65° C., to 130° C., preferably to 110° C. or 100° C.

When forming elastomers or other shaped products, curing is generally continued until the polyurethane has enough green strength to be manipulated without permanent damage. The gel times (determined as set forth in the following examples) may be, for example, 5 to 20 minutes. Demold times may be, for example, 5 minutes to 1 hour. The elastomer may be post-cured at an elevated temperature as just described to further complete the cure and develop mechanical and other properties.

Coatings are formed by applying the reaction mixture to the surface of a substrate to form a film and curing the film on the substrate to form an adherent coating. The application step is conveniently performed by a method such as spraying, brushing, rolling or immersion. Curing can be performed at ambient temperature or elevated temperature. The invention is particularly useful for producing thick protective coatings and/or to produce a soft surface. Coating compositions can be formulated to include pigments, dyes and other colorants as well as filler particles (which may also function as colorants), rheology modifiers of various types, and the like.

In the case in which the polyurethane is a sealant and/or adhesive, the reaction mixture is applied to a bondline, joint, crack or other opening between two substrates (or within parts of a single substrate) and cured in place such that it adheres to the substrate or substrates and at least partially seals the opening and/or bond the substrates together. Such an adhesive or sealant can be formulated with one or more fillers and colorants that are used to, for example, impart desired rheological and/or aesthetic characteristics, as well as urethane catalysts that promote a room temperature or other low temperature cure. Curing is generally performed under ambient conditions, but elevated temperatures can be used.

The following examples are provided to illustrate the invention, but are not intended to limit the scope thereof. All parts and percentages are by weight unless otherwise indicated.

PREPARATION OF CATALYSTS

Catalyst 1 is (2,5-bis(trifluoromethyl)phenyl)bis(3,5-bis (trifluoromethyl)phenyl)borane, which is prepared as follows: n-butyllithium (6.00 mL, 2.46 M in hexanes, 148 mmol) is added over 30 minutes to a cold (−78° C., $CO_2(s)$ bath) solution of 1-bromo-2,5-bis(trifluoromethyl)benzene (4.32 g, 14.8 mmol) in diethyl ether (200 mL). The reaction mixture is stirred for 1 hour in the dry ice bath with formation of precipitate. Isopropoxybis(3,5-bis(trifluoromethyl)phenyl)borane (7.32 g, 14.8 mmol) in ether (20 mL) is added over 30 minutes. The reaction mixture is allowed to warm to ambient temperature while stirring overnight to give a clear yellow solution. An HCl solution in ether (15.0 mL, 2.0 M, 30. mmol) is added with formation of colorless precipitate. The reaction mixture is filtered and the volatiles are removed under a nitrogen stream while stirring overnight to give a light yellow sticky solid. Ether (100 mL) is added (not all of the solid dissolves). Additional HCl (5.0 mL, 10. mmol) is added and the mixture is stirred for 2 hours. The mixture is filtered and the volatiles are removed under reduced pressure. The residue is extracted with toluene, filtered, and the volatiles are removed under reduced pressure. The residue is extracted with hot hexane, filtered, and the resulting solution is concentrated until solids begin forming even at 60° C. The mixture is chilled overnight in the freezer. The supernatant is decanted, the solids are washed with hexane, and the solid is dried under reduced pressure.

Catalyst 2 is bis(2,5-bis(trifluoromethyl)phenyl)(3,5-bis (trifluoromethyl)phenyl)borane, which is prepared as follows: n-butyllithium (4.00 mL, 2.54 M in hexanes, 10.1 mmol) is added to a cold (about −100° C.) solution of 1-bromo-2,5-bis(trifluoromethyl)benzene (3.00 g, 10.2 mmol) in diethyl ether (150 mL). The reaction mixture is stirred for 2 hours at around −100° C., then is allowed to warm up to −76° C. Bis(isopropoxy)(3,5-bis(trifluoromethyl)phenyl)borane (3.51 g, 10.3 mmol) in ether (10 mL) is added slowly. The reaction mixture is allowed to warm to ambient temperature while stirring overnight. Lithium(diethyletherate)diisopropoxy(3,5-bis(trifluoromethyl)phenyl) (2,5-bis(trifluoromethyl)phenyl)borate formed in this reaction is recovered from the reaction solvents and dried. The lithium(diethyletherate)diisopropoxy(3,5-bis(trifluoromethyl)phenyl)(2,5-bis(trifluoromethyl)phenyl)borate (5.34 g, 8.39 mmol) from the first stage of the reaction in ether is added to chlorotrimethylsilane (4.00 mL, 31.5 mmol) with rapid formation of precipitate. The reaction mixture is allowed to stir overnight. The reaction mixture is filtered and the volatiles are removed under reduced pressure. The residue is extracted with hexane, filtered, and the volatiles are removed overnight at 40° C. under reduced pressure to give isopropoxy(2,5-bis(trifluoromethyl)phenyl) (3,5-bis (trifluoromethyl)phenyl)borane as a yellow oil.

In a third stage, n-butyllithium (2.40 mL, 2.54 M in hexanes, 6.08 mmol) is added slowly to a cold (−78° C., $CO_2(s)$/methanol bath) solution of 1-bromo-2,5-bis(trifluoromethyl)benzene (1.80 g, 6.14 mmol) in diethyl ether (150 mL). The reaction mixture is stirred for 1 hour at −78° C. A solution of isopropoxy(2,5-bis(trifluoromethyl)phenyl)(3,5-bis(trifluoromethyl)phenyl)borane (3.02 g, 6.09 mmol) from the second stage in ether (18 mL) is added slowly. The reaction mixture is stirred for several hours at −78° C. The solution is allowed to warm to ambient temperature while stirring overnight to give a slightly yellow clear solution. The volatiles are removed from the reaction mixture to give a yellow oil. The oil is extracted with benzene, leaving nothing undissolved. The volatiles are removed from the reaction mixture to give lithium(diethyletherate) isopropoxybis(2,5-bis(trifluoromethyl)phenyl)(3,5-bis(trifluoromethyl)phenyl)borate as a yellow oil.

In a fourth stage, to a solution of lithium(diethyletherate) isopropoxybis(2,5-bis(trifluoromethyl)phenyl)(3,5-bis(trifluoromethyl)phenyl)borate (3.92 g, 4.95 mmol) in diethyl ether (150 mL) is added chlorotrimethylsilane (1.10 mL, 10.1 mmol) with stirring. Within 15 minutes precipitate begins to form. The reaction mixture is stirred overnight. The mixture is filtered and the volatiles are removed under reduced pressure to give a colorless solid. The product is extracted with hexane, filtered, and the volatiles are removed under reduced pressure to give bis(2,5-bis(trifluoromethyl) phenyl)(3,5-bis(trifluoromethyl)phenyl)borane as a pale solid.

Catalyst 3 is bis(3,5-bis(trifluoromethyl)phenyl)(2,3,5,6-tetrafluoro-4-(trifluoromethyl)phenyl)borane, which is prepared as follows: n-butyllithium (3.00 mL, 2.54 M in hexanes, 7.61 mmol) is added to a cold (about −100° C.) solution of 1-bromo-2,3,5,6-tetrafluoro-4-(trifluoromethyl) benzene (2.26 g, 7.61 mmol) in diethyl ether (100 mL) with stirring. The reaction mixture is stirred for 2 hours at around −100° C. then is allowed to warm up to −76° C. Isopropoxybis(3,5-bis(trifluoromethyl)phenyl)borane (3.78 g, 7.61 mmol) in ether (10 mL) is added slowly. The reaction mixture is allowed to warm to ambient temperature while stirring overnight. The product lithium bis(diethyletherate) isopropoxybis(3,5-bis(trifluoromethyl)phenyl) (2,3,5,6-tetrafluoro-4-(trifluoromethyl)phenyl)borate is isolated.

Chlorotrimethylsilane (2.00 mL, 18.4 mmol) is added to a solution of lithium bis(diethyletherate) isopropoxybis(3, 5-bis(trifluoromethyl)phenyl) (2,3,5,6-tetrafluoro-4-(trifluoromethyl)phenyl)borate (6.16 g, 7.10 mmol) in diethyl ether (100 mL). The reaction mixture is stirred overnight. Hydrogen chloride solution in ether (7.00 mL, 2.0 M, 14.0 mmol) is added and the reaction mixture is stirred overnight. The mixture is filtered and the volatiles are removed under reduced pressure. The product, the isopropanol adduct of bis(3,5-bis(trifluoromethyl)phenyl)(2,3,5,6-tetrafluoro-4-(trifluoromethyl)phenyl)borane, is then recovered and dried.

The isopropanol adduct of bis(3,5-bis(trifluoromethyl)phenyl)(2,3,5,6-tetrafluoro-4-(trifluoromethyl)phenyl)borane (0.42 g) is dissolved in THF (5-10 mL) and the volatiles are removed under reduced pressure. The addition and removal of THF (5-10 mL) is repeated four more times to yield the THF adduct of bis(3,5-bis(trifluoromethyl)phenyl)(2,3,5,6-tetrafluoro-4-(trifluoromethyl)phenyl)borane as a colorless powder.

Catalyst 4 is bis(3,5-bis(trifluoromethyl)phenyl)(pentachlorophenyl)borane, which is prepared as follows: n-butyllithium (5.00 mL, 2.54 M, 12.7 mmol) is added quickly dropwise to a cold (−78° C.) solution of hexachlorobenzene (3.61 g, 12.7 mmol) in diethyl ether (150 mL). The reaction mixture is stirred for 1 hour at −78° C., allowed to warm to −15° C. and is held at that temperature for 10 minutes by which time a bright yellow solution is obtained. The reaction mixture is cooled again to −78° C. and a solution of isopropoxybis(3,5-bis(trifluoromethyl)phenyl)borane (6.29 g, 12.7 mmol) in diethyl ether (15 mL) is added slowly. The reaction mixture is stirred for several hours at −78° C. and then is allowed to warm to ambient temperature while stirring overnight. The volatiles are removed under reduced pressure to give lithium bis(diethyletherate)bis(3,5-bis(trifluoromethyl)phenyl)(pentachlorophenyl)isopropoxyborate.

Lithium bis(diethyletherate)bis(3,5-bis(trifluoromethyl)phenyl) (pentachlorophenyl)isopropoxyborate (1.3 g, 1.4 mmol) is dissolved in ether (150 mL) and HCl solution (10.0 mL, 2.0 M in diethyl ether, 20 mmol) is added at ambient temperature. A precipitate forms immediately upon completion of the addition. The reaction mixture is stirred overnight at ambient temperature. The reaction mixture is filtered and the volatiles are removed under reduced pressure. The yellow-orange residue is extracted with benzene (200 mL), filtered, and the volatiles are removed under reduced pressure to give a yellow-orange solid. The yellow-orange solid obtained from the filtrate is dissolved in ether and additional HCl solution (10 mL) is added. The solution is concentrated until solids begin to form. The mixture is filtered and the volatiles are removed under reduced pressure to give an orange solid from the filtrate and nearly colorless material on the frit. The nearly colorless material on the frit is extracted with methylene chloride, filtered, and the volatiles are removed under reduced pressure to give the desired product as a white solid which is found by NMR to be clean desired product.

Catalyst 5 is the THF adduct of bis(3,5-bis(trifluoromethyl)phenyl)(2,4,6-trifluorophenyl)borane, which is prepared as follows: 3.00 grams (14.2 mmol) of 1-bromo-2,4,6-trifluorobenzene is combined with 200 mL of diethyl ether in a 500 mL Schlenk flask and chilled in a −78° C. bath. A 2.5 M solution of n-butyllithium in hexane (5.8 mL, 14 mmol) is added via syringe to the cold solution and stirred for 1 hour. A solution of 7.05 grams of bis(3,5-bis(trifluoromethyl)phenyl)isopropoxyborane in diethyl ether (25 mL) is injected into the cold mixture and stirred for half an hour. The reaction mixture is allowed to slowly warm to room temperature while stirring overnight. The next morning, the flask is returned to the glove box, the solution is filtered and all volatiles are removed under vacuum to yield a pale yellow solid. The solid is extracted with hexane (2×100 mL), the mixture is filtered, and the volatiles are removed from the filtrate under reduced pressure to give an off-white solid. The solid is triturated with hexane, the mixture is filtered, and the volatiles are removed from the filtrate under reduced pressure to give the product lithium bis(diethyletherate)bis(3,5-bis(trifluoromethyl)phenyl)(2,4,6-trifluorophenyfliso-propoxyborate as a white solid.

In a second stage, 8.00 g (10.2 mmol) of lithium bis(diethyletherate)bis(3,5-bis(trifluoromethyl)phenyl)(2,4,6-trifluorophenyl)isopropoxyborate from stage 1 is dissolved in 100 mL of diethyl ether to form a colorless solution. Chlorotrimethylsilane (3.2 mL, 2.7 g, 25 mmol) is added with stirring to the solution at room temperature. The mixture is allowed to stir overnight at room temperature with formation of copious precipitate. The reaction mixture is filtered through Celite to remove LiCl and the volatiles are removed from the filtrate under reduced pressure. The residue is extracted into benzene, the solution is filtered, and the volatiles are removed from the filtrate under reduced pressure to give bis(3,5-bis(trifluoromethyl)phenyl)(2,4,6-trifluorophenyl)borane as a white powder.

In a third stage, 4.45 g (7.82 mmol) of bis(3,5-bis(trifluoromethyl)phenyl)(2,4,6-trifluorophenyl)borane from stage 2 is dissolved in ether (20 mL) and THF (2 mL) is added. The volatiles are removed under reduced pressure to give the product, the THF adduct of bis(3,5-bis(trifluoromethyl)phenyl)(2,4,6-trifluorophenyl)borane, as a white solid.

Preparation of Polyether Polyols

Polyols 1-5 are made by polymerizing propylene oxide onto a 400 molecular weight polypropylene oxide) diol starter in the presence of Catalysts 1-5, respectively.

In each case, approximately 60-68 parts of the starter and a solution of the catalyst in tetrahydrofuran are combined under nitrogen in a pressure reactor. After purging with nitrogen, the reactor vent is closed and about 270-300 parts of propylene oxide is added at 55° C. at the rate of 1.25 parts/minute. The reaction mixture is digested for 20 minutes at the same temperature, followed by venting the reactor, purging with nitrogen at 90° C. and cooling. The type and amount of catalyst used in each case, the number average molecular weight (by GPC), polydispersity (by GPC), acetal content (by inverse-gated $^{13}C$ NMR) and primary hydroxyl content (by trifluoroacetic anhydride derivatation followed by $^9F$ NMR) are as reported in Table 1.

TABLE 1

|  | Polyol 1 | Polyol 2 | Polyol 3 | Polyol 4 | Polyol 5 |
| --- | --- | --- | --- | --- | --- |
| Catalyst, type/parts per million in the product | 1,250 | 2,250 | 3,250 | 4,250 | 5,500 |
| $M_n$ | 2157 | 2102 | 2232 | 2154 | 1937 |
| Polydispersity | 1.05 | 1.06 | 1.10 | 1.06 | 1.05 |
| Acetal content, mol-% | 0.64 | 0.90 | 1.22 | 1.18 | 0.54 |
| Primary OH content | 50% | 65% | 59% | 58% | 49% |

Preparation of Elastomers 1-5 and Comparative Samples A and B

Elastomer Examples 1-5 and Comparative Sample A are prepared in a "one-shot" process by combining 63.04 parts of polyol with 5.34 parts of 1,4-butanediol and 0.33 parts of a commercially available metal carboxylate catalyst (KKat®XK-604 from King Industries) on a laboratory mixer, followed by adding 30.3 parts of the polyisocyanate, mixing briefly and pouring the resulting reaction mixture into a 15.2 cm×15.2×0.155 cm chase and curing it in a press for 30 minutes at 80° C. under about 1200 psi (8.3 MPa). The resulting elastomer is removed from the chase and post-cured for 16 hours at 80° C. The amount of ingredients is chosen for each of Examples 1-5 and Comparative Samples A to produce an elastomer having a hard segment content of 36% by weight. No surfactants, solvents or other materials are included within the reaction mixture.

The polyisocyanate is a mixture of equal weights of a 143-equivalent weight carbodiimide modified MDI product and a 181 equivalent weight urethane group-containing MDI prepolymer, each having an isocyanate functionality of about 2 isocyanate groups per molecule.

Elastomer Examples 1-5 are made with Polyols 1-5, respectively.

In Comparative Sample A, the polyol (Polyol A) is a 1850 molecular weight ethylene-oxide capped polypropylene oxide) diol that contains 28% by weight oxyethylene units and has a primary hydroxyl content of greater than 80%.

Comparative Sample B is made in a "prepolymer" process. 63.04 parts of Polyol B (a 2000 molecular weight polypropylene oxide) diol having a primary hydroxyl content of 8%) is reacted with 30.3 parts of the polyisocyanate to form a prepolymer having an isocyanate content of about 5.5%. The resulting prepolymer, 5.34 parts of 1,4-butanediol and 0.33 parts of the metal carboxylate catalyst are combined in a laboratory mixer, poured into an open mold and cured as before to produce an elastomer having a hard segment content of 36%.

The formulations are evaluated for gel point on a parallel plate rheometer under conditions of 1 rad/second frequency, stress of 10 Pa, and isothermal temperature of 80° C. An uncured portion of the reaction mixture is placed between the plates and loss and storage moduli are measured as a function of time. Gel point is taken as the time at which loss modulus equals storage modulus.

The elastomers are evaluated for hardness according to ASTM D2240-15e1 at 22° C. and 50% relative humidity. Tensile properties are measured according to ASTM D638 using type V specimens, at a rate of 50 mm/minute under conditions of 22° C. and 50% relative humidity. Glass transition temperatures are measured by dynamic mechanical analysis at 0.05% strain, 1 Hz frequency, temperature sweep of −80° C. to 200° C. at a ramp rate of 5° C. per minute. Water aging is evaluated by immersing samples in 70° C. water for 7 days and measuring the weight gain. Results are as indicated in Table 2.

TABLE 2

| Property | Result | | | | | | |
|---|---|---|---|---|---|---|---|
| | Comp. A* | Comp. B* | Ex. 1 | Ex. 2 | Ex. 3 | Ex. 4 | Ex. 5 |
| Gel Point, min | 8 | 11 | 10 | 9 | 8 | 9 | 10 |
| Shore A hardness | 64 | 69 | 68 | 68 | 69 | 68 | 67 |
| Young's Modulus, MPa | 5.6 | 8.3 | 8.0 | 7.9 | 8.6 | 8.4 | 7.1 |
| Elongation, % | 1213 | 995 | 1146 | 1032 | 1045 | 981 | 1059 |
| Soft Segment $T_g$, ° C. | −36 | −35 | −34 | −33 | −34 | −34 | −32 |
| Hard Segment $T_g$, ° C. | 141 | 140 | 132 | 133 | 137 | 133 | 126 |
| Water uptake, % | 4.2 | 2.4 | 2.3 | 2.3 | 2.1 | 2.3 | 2.3 |

Comparative Sample A is typical of conventional one-shot elastomer production using an ethylene oxide-capped polypropylene oxide). The gel time is short because of the high amount of primary hydroxyl groups in the polyol. However, the hardness and Young's modulus are somewhat lower than the other samples. In addition, the water uptake is over 4%, which is attributed to the presence of the ethylene oxide cap on the polyol.

Comparative Sample B typifies a conventional prepolymer approach. Because the polyol is not ethylene oxide-capped, it contains few primary hydroxyl groups and is less reactive towards isocyanates. Therefore, it is formed into a prepolymer in a first reaction, and the prepolymer is cured with the chain extender in the mold. Even with this approach, the gel time is much longer than Comparative Sample A. However, a harder product is obtained having a higher tensile strength, and water uptake is reduced substantially. These properties represent a target for elastomers made in a one-shot process.

Examples 1-5 are made in a one-shot process. As seen in Table 2, the gel points are shorter than for Comparative Sample B. Despite this, the hardness and tensile properties are comparable to those of Comparative Sample B and much greater than those obtained in the conventional one-shot process (Comp. Sample A). Moreover, water uptake is low. This invention provides the benefits of good reactivity, good mechanical properties and low water uptake in a one-shot process.

Preparation of Elastomers 6-10 and Comparative Samples C and D

Elastomer Examples 6-10 and Comparative Samples C and D are prepared in the same manner as Examples 1-5 and Comparative Samples A and B, respectively, except the amounts of ingredients are selected in each case to produce an elastomer having a hard segment content of 50% by weight. Thus in each case the amount of polyol is 49.5 parts, the amount of 1,4-butanediol is 8.7 parts, the amount of isocyanate is 41.4 parts and the amount of catalyst is 0.33 parts. As before, no surfactants, solvents or other materials are included within the reaction mixture.

Elastomer Examples 6-10 are made with Polyols 1-5, respectively. Comparative Samples C and D are made with Polyols A and B, respectively.

The properties of the elastomer are determined as before and are as indicated in Table 3.

TABLE 3

| Property | Result | | | | | | |
|---|---|---|---|---|---|---|---|
| | Comp. C* | Comp. D* | Ex. 6 | Ex. 7 | Ex. 8 | Ex. 9 | Ex. 10 |
| Gel Point, min | 8 | 7 | 7 | 9 | 8.5 | 8 | 7.5 |
| Shore A hardness | 89 | 91 | 92 | 91 | 91 | 92 | 90 |
| Young's modulus, MPa | 38.6 | 48.9 | 50.9 | 53 | 59.2 | 56.1 | 48.8 |
| Elongation, % | 671 | 344 | 577 | 290 | 324 | 393 | 291 |
| Soft Segment $T_g$, ° C. | −33 | −32 | −30 | −31 | −31 | −30 | −27 |
| Hard Segment $T_g$, ° C. | 130 | 134 | 128 | 123 | 127 | 125 | 127 |
| Water uptake, % | 3.5 | 2.1 | 2.3 | 1.9 | 2.2 | 2.1 | 2.1 |

The same trends are seen in this data as before. Gel times for Examples 6-10 are similar to Comparative Sample C. Examples 6-10 have significantly higher tensile strengths than Comparative Sample C. As before, the tensile strengths produced in the one-shot process of this invention are comparable to those obtained in a conventional prepolymer process. As before, water uptake is substantially reduced with this invention, compared with Comparative Sample C. This invention provides the process benefits of a one-shot process that uses an ethylene oxide-capped polyol while obtaining the mechanical properties and moisture resistance of elastomers made in a conventional prepolymer process using a slow-reacting, low primary hydroxyl polyol.

What is claimed is:

1. A polyurethane which is the reaction product of a reaction mixture including i) one or more polyisocyanates, ii) one or more chain extenders and/or crosslinkers and iii) one or more polyols having a hydroxyl equivalent weight of at least 350, wherein at least 50% of the weight of iii) is a hydroxyl-containing homopolymer of propylene oxide, the hydroxyl-containing homopolymer of propylene oxide having a hydroxyl equivalent weight of at least 350, an average of 1.8 to 3 hydroxyl groups per molecule of which hydroxyl groups 40 to 65% are primary hydroxyl groups, and a polydispersity of 1.00 to 1.08.

2. The polyurethane of claim 1 which has a hard segment content of 15 to 60% by weight.

3. The polyurethane of claim 2 wherein the hydroxyl-containing homopolymer of propylene oxide has a hydroxyl equivalent weight of 400 to 3000 and an average of 2 to 2.5 hydroxyl groups per molecule.

4. The polyurethane of claim 2 wherein the hydroxyl-containing homopolymer of propylene oxide has a hydroxyl equivalent weight of 400 to 2000 and an average of 2 to 2.5 hydroxyl groups per molecule of which 45 to 65% are primary hydroxyl groups.

5. The polyurethane of claim 2 further comprising a step of making the hydroxyl-containing homopolymer of propylene oxide by polymerizing propylene oxide in the presence of a Lewis acid catalyst having the general formula $$M(R^1)_1(R^2)_1(R^3)_1(R^4)_{0\ or\ 1}$$

wherein M is boron, aluminum, indium, bismuth or erbium, $R^1$ is a fluoroalkyl-substituted phenyl group and $R^2$ and $R^3$ each are a fluoroalkyl-substituted phenyl group, a fluoro-substituted phenyl group, a chloro-substituted phenyl group or a fluoro- and chloro-substituted phenyl group, provided that $R^1$, $R^2$ and $R^3$ are not all the same, and $R^4$ is selected from the group consisting of diethyl ether, cyclopentyl methyl ether, methyl tertiary-butyl ether, tetrahydrofuran, tetrahydropyran, 1,4-dioxane, acetone, methyl isopropyl ketone, isopropyl acetate, and isobutyl acetate.

6. The polyurethane of claim 2 wherein the hydroxyl-containing homopolymer of propylene oxide contains at most 1.5 mole-% acetals, based on the moles of carbon atoms in the hydroxyl-containing polymer of propylene oxide.

7. The polyurethane of claim 2 wherein the one or more polyisocyanates has an isocyanate equivalent weight of 80 to 200.

8. The polyurethane of claim 2 wherein component ii) includes one or more hydroxyl-terminated chain extenders and/or crosslinkers.

9. The polyurethane of claim 8 wherein component ii) includes one or more of 1,2-ethane diol, 1,2- or 1,3-propane diol, 1,4-butane diol, diethylene glycol, triethylene glycol, dipropylene glycol, tripropylene glycol, neopentyl glycol and alkoxylates of any of the foregoing having a hydroxyl equivalent weight of less than 175.

10. The polyurethane of claim 9 wherein component ii) includes one or more of glycerin, trimethylolpropane, trimethylolethane, erythritol, pentaerythritol, triethanolamine, diethanolamine and alkoxylates of any of the foregoing having a hydroxyl equivalent weight of less than 175.

11. A one-shot method for making a polyurethane, comprising forming a reaction mixture comprising i) one or more polyisocyanates, wherein the one or more polyisocyanates has a number average isocyanate equivalent weight of no greater than 200, and isocyanate-reactive materials that include ii) at least one chain extender and/or at least one crosslinker and iii) one or more polyols having a hydroxyl equivalent weight of at least 350, wherein at least 50% of the weight of iii) is a hydroxyl-containing homopolymer of propylene oxide, the homopolymer of propylene oxide having a hydroxyl equivalent weight of at least 350, an average of 1.8 to 3 hydroxyl groups per molecule of which hydroxyl groups 40% to 65% are primary hydroxyl groups and a polydispersity of 1.00 to 1.08, and curing the reaction mixture in one step and in the presence of no more than 5%, based on the weight of the reaction mixture, of a solvent, to form the polyurethane, wherein the one or more polyisocyanates and the at least one chain extender and/or at least one crosslinker together constitute 15 to 60% of the total combined weight of the one or more polyisocyanates and isocyanate-reactive materials.

12. The method of claim 11 further comprising a step of making the hydroxyl-containing homopolymer of propylene oxide by polymerizing propylene oxide in the presence of a Lewis acid catalyst having the general formula $$M(R^1)_1(R^2)_1(R^3)_1(R^4)_{0\ or\ 1}$$

wherein M is boron, aluminum, indium, bismuth or erbium, $R^1$ is a fluoroalkyl-substituted phenyl group and $R^2$ and $R^3$ each are a fluoroalkyl-substituted phenyl group, a fluoro-substituted phenyl group, a chloro-substituted phenyl group or a fluoro- and chloro-substituted phenyl group, provided that $R^1$, $R^2$ and $R^3$ are not all the same, and $R^4$ is selected from the group consisting of diethyl ether, cyclopentyl methyl ether, methyl tertiary-butyl ether, tetrahydrofuran, tetrahydropyran, 1,4-dioxane, acetone, methyl isopropyl ketone, isopropyl acetate, and isobutyl acetate.

* * * * *